(12) United States Patent
Haas et al.

(10) Patent No.: US 11,423,900 B2
(45) Date of Patent: Aug. 23, 2022

(54) EXTRACTING CUSTOMER PROBLEM DESCRIPTION FROM CALL TRANSCRIPTS

(71) Applicant: Intuit Inc., Mountain View, CA (US)

(72) Inventors: Noa Haas, Tel Aviv (IL); Alexander Zicharevich, Petach Tikva (IL); Oren Sar Shalom, Nes Ziona (IL); Adi Shalev, Herzlia (IL)

(73) Assignee: Intuit Inc., Mountain View, CA (US)

( * ) Notice: Subject to any disclaimer, the term of this patent is extended or adjusted under 35 U.S.C. 154(b) by 198 days.

(21) Appl. No.: 16/836,886

(22) Filed: Mar. 31, 2020

(65) Prior Publication Data

US 2021/0304747 A1 Sep. 30, 2021

(51) Int. Cl.
*G10L 15/22* (2006.01)
*G06N 20/00* (2019.01)
*G10L 15/06* (2013.01)
*G10L 15/08* (2006.01)
*G10L 15/30* (2013.01)

(52) U.S. Cl.
CPC .............. *G10L 15/22* (2013.01); *G06N 20/00* (2019.01); *G10L 15/063* (2013.01); *G10L 15/08* (2013.01); *G10L 15/30* (2013.01); *G10L 2015/088* (2013.01); *G10L 2015/223* (2013.01)

(58) Field of Classification Search
CPC . G10L 15/26; G10L 15/22; G10L 2015/0631; G10L 15/08
See application file for complete search history.

(56) References Cited

U.S. PATENT DOCUMENTS

| 10,764,431 | B1* | 9/2020 | Pham ................ H04M 3/42221 |
| 2018/0113854 | A1* | 4/2018 | Vig ........................ G06F 40/35 |
| 2020/0175961 | A1* | 6/2020 | Thomson ............ G06F 21/6245 |
| 2021/0142789 | A1* | 5/2021 | Gurbani ................ G06F 40/279 |
| 2021/0158234 | A1* | 5/2021 | Sivasubramanian ........................ H04M 3/5175 |

\* cited by examiner

*Primary Examiner* — Matthew H Baker
(74) *Attorney, Agent, or Firm* — Paradice and Li LLP

(57) ABSTRACT

Systems and methods for automatically identifying problem-relevant sentences in a transcript are disclosed. In an example method, a transcript may be received of a first support call. A region of the first support call transcript may be identified, and first customer utterances may be detected in the region using a trained classification model. A trained regression model may estimate a relevancy to the problem statement of each of the first customer utterances, and one or more most problem-relevant statements may be selected from the first customer utterances, based on the estimated relevancies.

18 Claims, 3 Drawing Sheets

EXTRACTING CUSTOMER PROBLEM DESCRIPTION FROM CALL TRANSCRIPTS

TECHNICAL FIELD

This disclosure relates generally to methods for summarizing customer support calls, and more specifically to extracting problem descriptions from transcripts of customer support calls.

DESCRIPTION OF RELATED ART

Increasingly, companies and institutions are employing assisted support sessions for providing customer service and assistance. Transcripts may be generated for support calls provided as a part of such assisted support sessions. It may further be beneficial to summarize the customer's problem for each transcript. However, agents may spend a significant amount of time summarizing calls, and summaries may vary significantly in quality and style between agents.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for identifying problem-relevant sentences in a transcript. The method may include receiving a transcript of a first support call, identifying a region of the transcript predicted to include a problem statement, detecting, using a trained classification model, first customer utterances within the identified region, estimating, using a trained regression model, a relevancy to the problem statement of each of the first customer utterances, and selecting one or more most problem-relevant utterances, among the first customer utterances, based on the estimated relevancies.

Another innovative aspect of the subject matter described in this disclosure can be implemented as a system for identifying problem-relevant sentences in a transcript. The system may include one or more processors, and a memory storing instructions for execution by the one or more processors. Executing the instructions causes the system to perform operations including receiving a transcript of a first support call, identifying a region of the transcript predicted to include a problem statement, detecting, using a trained classification model, first customer utterances within the identified region, estimating, using a trained regression model, a relevancy to the problem statement of each of the first customer utterances, and selecting one or more most problem-relevant utterances, among the first customer utterances, based on the estimated relevancies.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Implementations of the subject matter described in this disclosure may be used to efficiently extract customer statements from a support call transcript which have high relevance to the customer's problem, and the topic of the support call. Automatically determining such problem relevant customer statements may save time agents would otherwise spend summarizing calls and may also standardize summary style and quality among agents. More particularly, example implementations may identify regions of transcripts where problem statements are likely to be made. Such regions may be identified based on clustering agent statements and questions according to specified heuristics, such as beginning with the region after an agent asks a question prompting the customer to identify their problem and ending before the agent states an ability to help the customer with the identified problem. Further, a classification model may be trained for identifying customer utterances within an identified problem statement region. A regression model may be trained on historical problem summaries and corresponding historical transcripts for estimating problem statement relevance of the customer utterances within the problem statement region.

Various implementations of the subject matter disclosed herein provide one or more technical solutions to the technical problem of automatically identifying the sentences of a support call transcript which are most likely to contain the customer's problem statement. More specifically, various aspects of the present disclosure provide a unique computing solution to a unique computing problem that did not exist prior to electronic or online customer support systems that can generate transcripts of customer support calls. By training classification models, regression models, and applying appropriate clustering models and heuristics, the subject matter disclosed herein provide meaningful improvements to the performance and utility of customer support systems, and more specifically to automatically summarizing customer support calls by identifying problem statements as expressed by the customers themselves. As such, implementations of the subject matter disclosed herein are not an abstract idea such as organizing human activity or a mental process that can be performed in the human mind, for example, because the human mind is not capable of training classification models, regression models, or employing trained classification models, regression models, and clustering models to automatically process transcripts in order to identify the most problem relevant customer statements.

Figure 1:
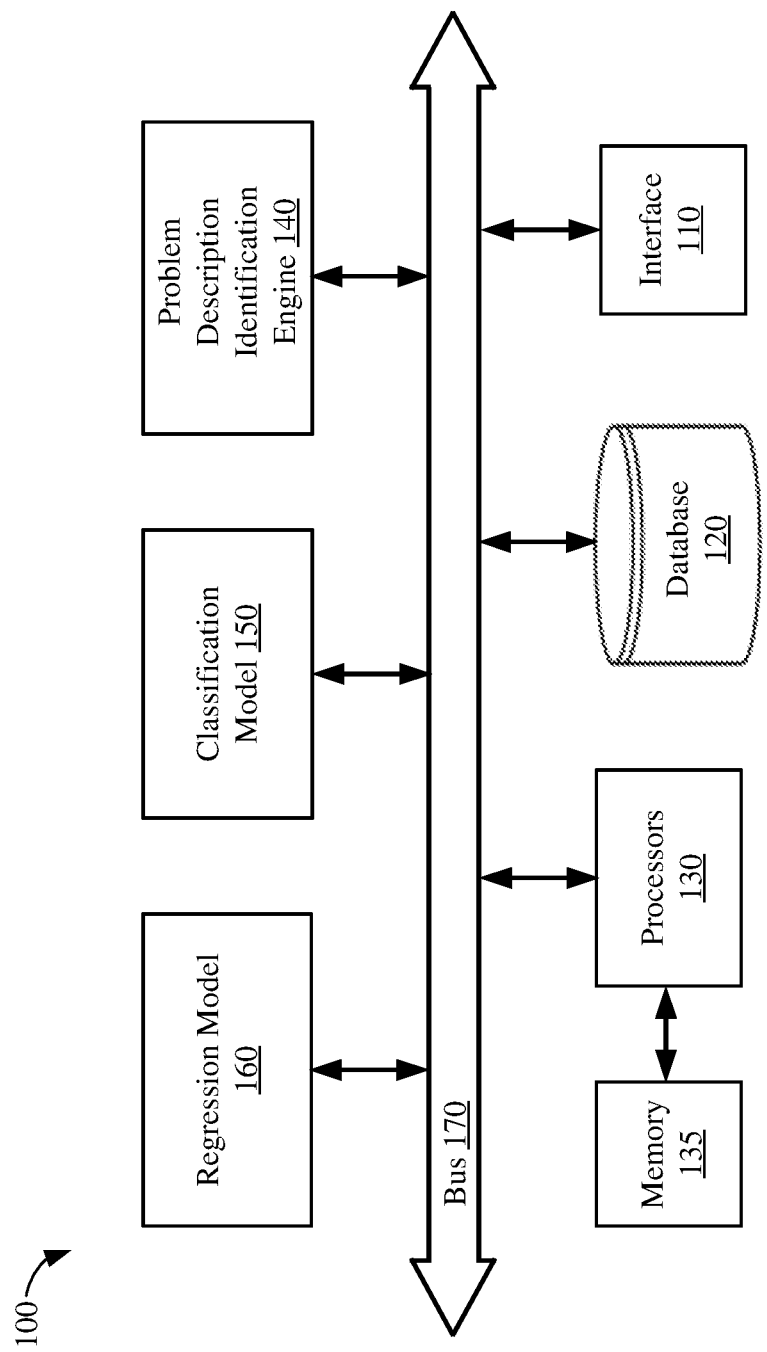
FIG. 1 shows a problem statement identification system, according to some implementations.

FIG. 1 shows a problem statement identification system 100, according to some implementations. Various aspects of the problem statement identification system 100 disclosed herein may be applicable for identifying problem-relevant statements in transcripts of support calls between agents and users of a customer support system associated with the problem statement identification system 100. For example, the support call problem statement identification transcription system 100 may be used to select problem statement regions of such transcripts, to identify and filter customer statements made within such problem statement regions, and to automatically identify the most relevant customer statements within the problem statement regions.

The problem statement identification system 100 is shown to include an input/output (I/O) interface 110, a database 120, one or more data processors 130, a memory 135 coupled to the one or more data processors 130, a problem description identification engine 140, a classification model 150, and a regression model 160. In some implementations, the various components of the problem statement identification system 100 may be interconnected by at least a data bus 170, as depicted in the example of FIG. 1. In other implementations, the various components of the problem statement identification system 100 may be interconnected using other suitable signal routing resources.

The interface 110 may include a screen, an input device, and other suitable elements that allow a user to provide information to the problem statement identification system 100 and/or to retrieve information from the problem statement identification system 100. Example information that can be provided to the problem statement identification system 100 may include one or more sources of training data, such as historical support call transcripts and associated agent summaries, and so on. Example information that can be retrieved from the problem statement identification system 100 may include one or more support call transcripts and associated problem statements, and so on.

The database 120, which may represent any suitable number of databases, may store any suitable information pertaining to sources of training data, historical data, transcripts, and so on for the problem statement identification system 100. The sources of training data may include one or more sources of historical support call transcripts and associated agent summaries. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations, may be one or more suitable processors capable of executing scripts or instructions of one or more software programs stored in the problem statement identification system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration). In some implementations, the data processors 130 may be remotely located from one or more other components of problem statement identification system 100.

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The problem description identification engine 140 may be used to identify regions of input support call transcripts which are most likely to contain customer statements relevant to the customer's problem—regions which may be called "problem statement regions." For example, the problem description identification engine 140 may employ one or more clustering models to identify starting and ending points of the problem statement region according to one or more heuristics, as discussed further below. The problem description identification engine 140 may also train the classification model 150, as discussed below. Further, the problem description identification engine 140 may select appropriate training data for training the regression model 160, such as one or more problem summaries of historical support calls, and one or more corresponding transcripts of the historical support calls. In some implementations the problem description identification engine 140 may also pre-process input support call transcripts. For example, the problem description identification engine 140 may pre-process an input support call transcript by filtering the input support call transcript of uninformative or generic transcripts. Such filtering may be performed using a suitable technique such as a term frequency-inverse document frequency or "tf-idf" technique. The pre-processing may further include filtering the input support call transcript of one or more stop words and/or disfluencies.

The classification model 150 may be trained to distinguish customer utterances within a specified region of a transcript from customer utterances outside of the specified region. For example, the classification model 150 may, once trained, distinguish customer utterances in specified problem statement regions of a transcript, such as identified by problem description identification engine 140, from customer utterances outside of the problem statement region. The classification model 150 may store any number of regression or machine learning models that can be used to distinguish customer utterances within a specified region of a transcript from customer statements outside of the specified region. A regression or machine learning model can take the form of an extensible data structure that can be used to represent sets of words or phrases and/or can be used to represent sets of attributes or features. Regression models may be based on one or more methods such as linear regression, such as using the method of lease squares, nonlinear regression, Bayesian linear regression, percentage regression, and so on. The regression model 160 may be a deep neural network (DNN), which may have any suitable architecture, such as a feed-forward architecture or a recurrent architecture.

The regression model 160 may be trained based on the training data, for example as selected by the problem description identification engine 140, to estimate a relevancy to the purpose of the customer's call for each customer utterance in the problem statement region, as discussed in more detail below. Such relevancies may be referred to as problem statement relevancies and may indicate a degree of relevance of a statement to the problem or purpose of the support call. More specifically, the regression model 160 may use the historical transcripts and problem summaries of historical support calls to predict the relevance of a customer utterance to the customer's problem based on similarities between customer utterances in the historical transcripts and a corresponding problem summaries of the historical transcripts.

The regression model 160 may store any number of regression or machine learning models that can be used to automatically estimate problem statement relevance of customer utterances once trained using appropriate historical data. A regression or machine learning model can take the form of an extensible data structure that can be used to represent sets of words or phrases and/or can be used to represent sets of attributes or features. Regression models may be based on one or more methods such as linear regression, such as using the method of lease squares, nonlinear regression, Bayesian linear regression, percentage regression, and so on. The models may be seeded with training data representing historical problem summaries and historical support call transcripts, as discussed further below. The regression model 160 may be a deep neural network (DNN), which may have any suitable architecture, such as a feedforward architecture or a recurrent architecture.

The particular architecture of the problem description identification system 100 shown in FIG. 1 is but one example of a variety of different architectures within which aspects of the present disclosure may be implemented. For example, in other implementations, the problem description identification system 100 may not include a problem description identification engine 140, the functions of which may be implemented by the processors 130 executing corresponding instructions or scripts stored in the memory 135. In some other implementations, the functions of the classification model 150 may be performed by the processors 130 executing corresponding instructions or scripts stored in the memory 135. Similarly, the functions of the regression model 160 may be performed by the processors 130 executing corresponding instructions or scripts stored in the memory 135. In some other examples, the problem description identification system 100 may be implemented as software as a service (SaaS), or as managed software as a service (MSaaS). For example, when implemented as SaaS or MSaaS the functions of the problem description identification system 100 may be centrally hosted and may be accessed by users using a thin client, such as a web browser.

Figure 2:
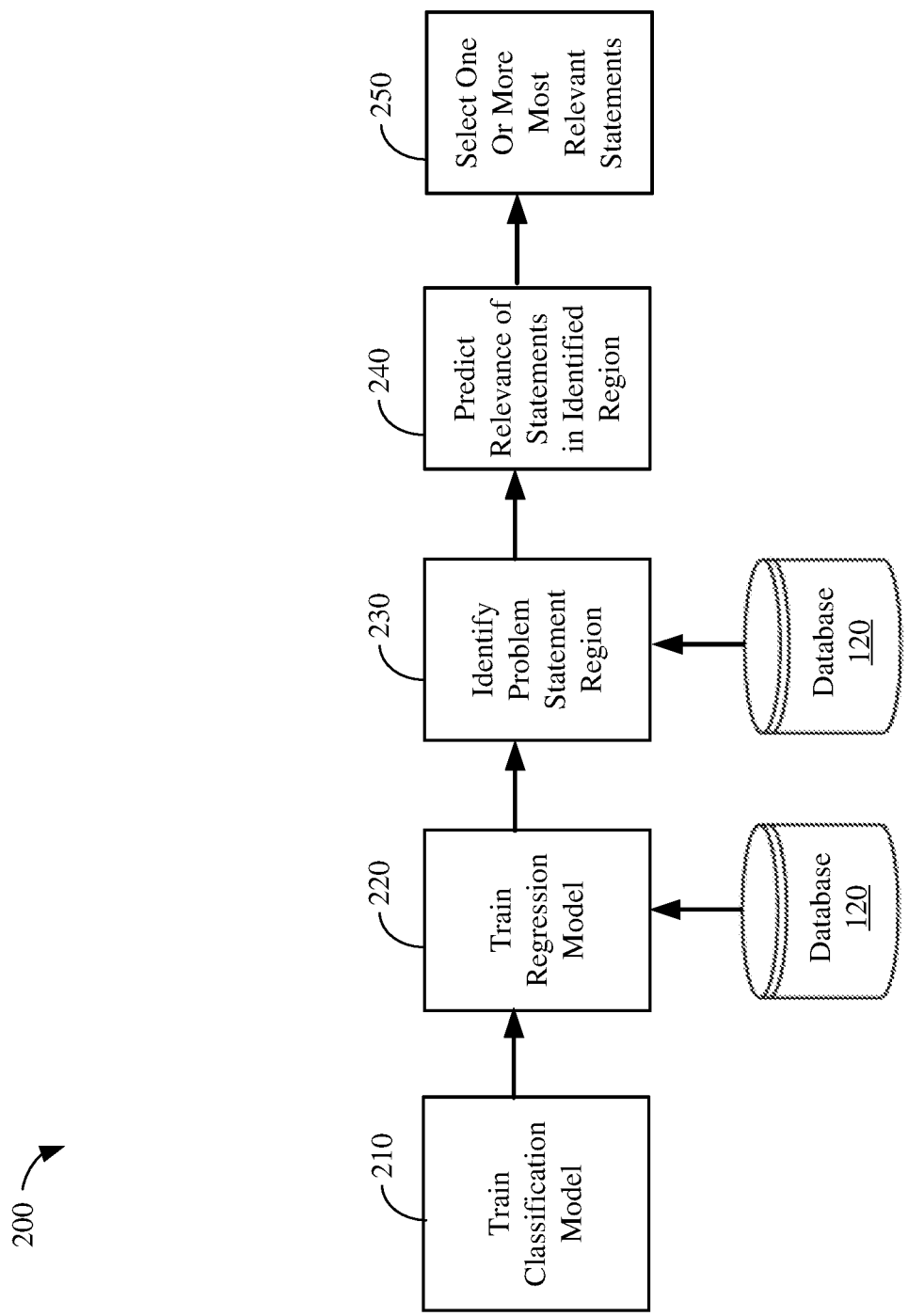
FIG. 2 shows a high-level overview of an example process flow that may be employed by the problem statement identification system of FIG. 1.

FIG. 2 shows a high-level overview of an example process flow 200 that may be employed by the problem description identification system 100 of FIG. 1. In block 210, the classification model 150 may be trained to detect customer utterances from within a specified problem description region from other customer utterances, outside the problem description region, in a transcript of a support call. For example, the classification model 150 may be trained to detect such customer utterances in customer support transcripts generated from real-time conversations between a customer and an agent of a customer support system. At block 220, the regression model 160 may be trained to estimate problem statement relevancy of customer utterances in the specified problem description region. More particularly, historical problem summaries for corresponding historical support call transcripts may be used for training the regression model 160. Such historical support call transcripts and problem summaries may be retrieved, for example, from database 120. In some implementations, training the regression model 160 may include identifying a problem description region for each historical support call transcript and comparing each customer utterance in the problem description region to the problem summary for the historical support call transcript. In some other implementations the problem description region of historical support call transcripts may already be indicated in the training data for the regression model 160. A similarity may be calculated for each customer utterance in the problem description region of a historical support call transcript, representing a similarity between the customer utterance and the corresponding problem summary. For example, the similarity may be calculated using a suitable text similarity metric, such as a bidirectional encoder representation from transformers (BERT) metric. After calculating the similarities, the similarities may be used for training the regression model 160 to predict the similarity metric for each customer utterance in the problem statement region. Such training may be performed using a supervised regression framework. Note that in some implementations, the similarities between each customer utterance and the corresponding problem summary of the historical support call transcripts may be previously determined and included in the training data retrieved from the database 120.

At block 230, the problem description identification engine 140 may identify a problem statement region for an input support call transcript. The input support call transcript may be retrieved from the database 120 in some implementations. As discussed above, in some implementations identifying the problem description region may include preprocessing the input support call transcript by filtering uninformative sentences, stop words, and disfluencies from the support call transcript. The problem description identification engine 140 may employ one or more clustering models, based on one or more heuristics, for identifying the problem statement region. A question clustering model may cluster questions spoken by the agent on the support call in order to extract a cluster which represents questions likely to indicate a start of the problem statement region. A heuristic for such questions may be that the problem statement region should start just after a question from the agent asking the customer to identify their problem, such as, for example, "how can I help you today?" A heuristic for identifying the end of the problem statement region may be that the problem statement region should end just before the agent utters a concluding statement such as, for example, "yes, I can help you with that." Thus, another clustering model may be applied to all agent sentences in order to characterize a cluster of sentences which mark such potential problem statement region endings. Using these heuristics, potential problem boundaries may be extracted from the input support call transcript. In some implementations a problem statement region may be successfully identified when both a starting boundary and an ending boundary are identified (i.e., using the heuristics described above) and when the region length is less than a threshold length. In some examples this threshold length may be 3 minutes, such that successfully identified problem description regions are no longer than 3 minutes.

At block 240, the trained regression model 160 may be used to predict the problem statement relevance of each customer utterance in the identified problem statement region of the input support call transcript. As discussed above with respect to block 220, the trained regression model 160 may predict a problem statement relevancy for each customer utterance in the problem statement region identified in block 230. In some implementations, at block 250, the trained regression model 160 may select one or more most relevant statements based on the predicted problem statement relevancies. In some implementations the one or more most relevant statements may include a number (n) of customer utterances in the problem statement region having the highest predicted problem statement relevancy, where n is a positive integer (e.g., n may be 1, 2, 3, and so on).

After selecting the one or more most relevant statements, they may be provided for use as a problem description for the input support call transcript. In some implementations the agent associated with the support call transcribed by the input support call transcript may further review the one or more most relevant statements and select one or more of the most relevant statements for selection as the problem description for the support call.

Figure 3:
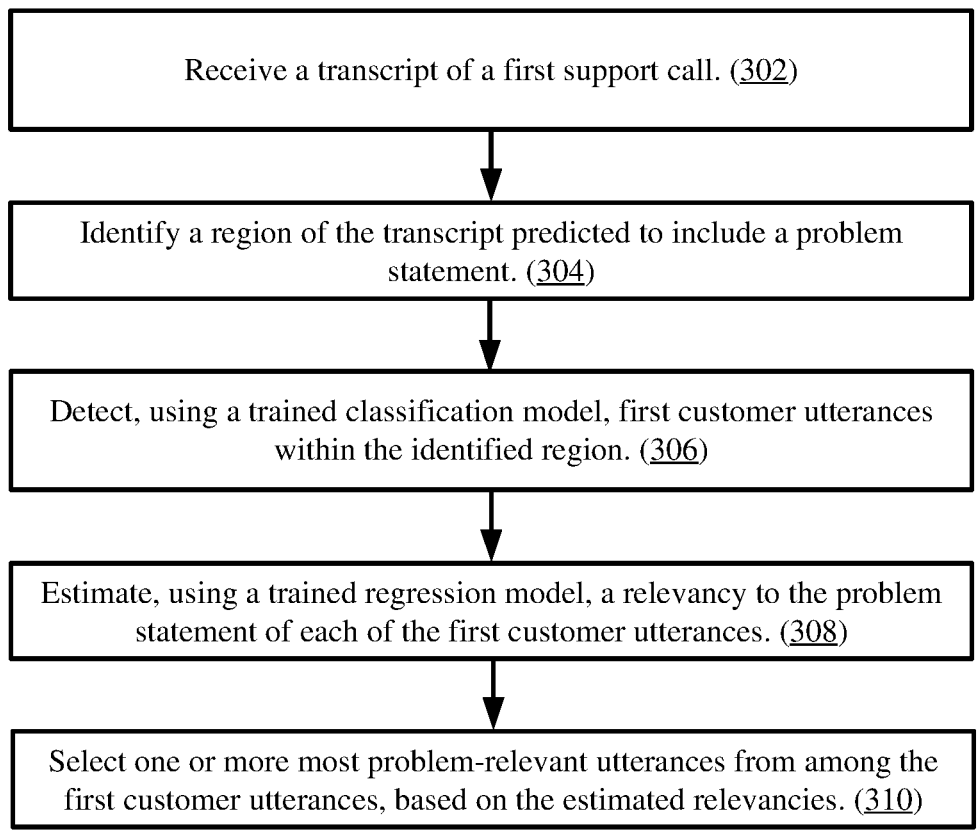
FIG. 3 shows an illustrative flow chart depicting an example operation for identifying problem-relevant sentences in a transcript, according to some implementations.

FIG. 3 shows an illustrative flow chart depicting an example operation 300 for identifying problem-relevant sentences in a transcript, according to some implementations. The example operation 300 may be performed by one or more processors of a problem description identification system. In some implementations, the example operation 300 may be performed using the problem description identification system 100 of FIG. 1. It is to be understood that the example operation 300 may be performed by any suitable systems, computers, or servers.

At block 302, the problem description identification system 100 receives a transcript of a first support call. At block 304, the problem description identification system 100 identifies a region of the transcript predicted to include a problem statement. At block 306, the problem description identification system 100 detects, using a trained classification model, first customer utterances within the identified region. At block 308, the problem description identification system 100 estimates, using a trained regression model, a relevancy to the problem statement of each of the first customer utterances. At block 310, the problem description identification system 100 selects one or more most problem-relevant utterances from among the first customer utterances.

In some implementations identifying the region of the transcript in block 304 includes identifying a cluster of questions spoken by an agent participating in the first support call, each question of the cluster of questions querying a user participating in the first support call to identify a problem, selecting a question, of the cluster of questions, associated with the problem statement and determining a start of the region to follow a selected question of the cluster of questions. In some implementations identifying the region of the transcript in block 304 includes identifying a cluster of statements spoken by the agent, each statement of the cluster of agents conforming that the agent is able to assist the customer with the problem, selecting a statement, of the cluster of statements, associated with the problem statement, and determining an end of the problem statement region to precede the selected statement of the cluster of statements. In some implementations the identified region is selected to have a length not longer than a maximum problem statement length, which in some examples may be three minutes.

In some implementations the operation 300 may further include training the regression model based at least in part on historical problem summaries of historical support calls and on corresponding transcripts of the historical support calls. In some implementations the regression model is trained based on determined similarities between the historical problem summaries and customer utterances in the corresponding transcripts. In some implementations training the regression model includes training the regression model to determine the problem statement relevancy of each customer utterance in the identified region based on a predicted similarity between each customer utterance in the specified region and a problem summary for the corresponding transcript. In some implementations the similarity is determined based at least in part on a bidirectional encoder representation from transformers (BERT) metric.

In some implementations the operation 300 may further include pre-processing the first support transcript by filtering the first support call transcript of uninformative sentences. In some implementations the uninformative sentences may be filtered based at least in part on a term frequency inverse document frequency (tf-idf) operation. In some implementations the first support transcript may be filtered to remove one or more stop words and disfluencies from the first support call transcript.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for identifying problem-relevant sentences, the method performed by one or more processors and comprising:
    receiving a transcript of a first support call;
    identifying a region of the transcript predicted to include a problem statement;
    detecting, using a trained classification model, first customer utterances within the identified region;
    estimating, using a trained regression model, a relevancy to the problem statement of each of the first customer utterances, wherein the regression model is trained based at least in part on determined similarities between historical problem summaries of historical support calls and customer utterances in corresponding transcripts of the historical support calls, the regression model being trained to predict a relevancy of each customer utterance in the identified region based on a predicted degree of similarity between each customer utterance and a corresponding problem summary for the input support call transcript, the degree of similarity predicted based at least in part on a bidirectional encoder representation from transformers (BERT) metric; and
    selecting one or more most problem-relevant utterances, among the first customer utterances, based on the estimated relevancies.

2. The method of claim 1, wherein identifying the region of the transcript comprises:
    identifying a cluster of questions spoken by an agent participating in the first support call, each question of the cluster of questions querying a user participating in the first support call to identify a problem;
    selecting a question, of the cluster of questions, associated with the problem statement; and
    determining a start of the region to follow the selected question.

3. The method of claim 2, wherein identifying the region of the transcript further comprises:
    identifying a cluster of statements spoken by the agent, each statement of the cluster of statements confirming that the agent is able to assist the customer with the problem;
    selecting a statement, of the cluster of statements, associated with the problem statement; and
    determining an end of the region to precede the selected statement.

4. The method of claim 1, further comprising:
    preprocessing the transcript by filtering uninformative sentences from the transcript.

5. The method of claim 4, wherein the transcript is filtered based at least in part on a term frequency inverse document frequency (tf-idf) operation.

6. The method of claim 1, further comprising:
    preprocessing the transcript by filtering one or more stop words and disfluencies from the transcript.

7. A system for identifying problem-relevant sentences, the system comprising
    one or more processors; and
    a memory storing instructions that, when executed by the one or more processors, cause the system to perform operations comprising:
    receiving a transcript of a first support call;
    identifying a region of the transcript predicted to include a problem statement;
    detecting, using a trained classification model, first customer utterances within the identified region;
    estimating, using a trained regression model, a relevancy to the problem statement of each of the first customer utterances, wherein the regression model is trained based at least in part on determined similarities between historical problem summaries of historical support calls and customer utterances in corresponding transcripts of the historical support calls, the regression model being trained to predict a relevancy of each customer utterance in the identified region based on a predicted degree of similarity between each customer utterance and a corresponding problem summary for the input support call transcript, the degree of similarity predicted based at least in part on a bidirectional encoder representation from transformers (BERT) metric; and
    selecting one or more most problem-relevant utterances from the first customer utterances, based on the estimated relevancies.

8. The system of claim 7, wherein execution of the instructions to identify the region causes the system to perform operations further comprising:
    identifying a cluster of questions spoken by an agent participating in the first support call, each question of the cluster of questions querying a user participating in the first support call to identify a problem;
    selecting a question, of the cluster of questions, associated with the problem statement; and
    selecting a start of the region to follow the selected question.

9. The system of claim 8, wherein execution of the instructions to identify the region causes the system to perform operations further comprising:
    identifying a cluster of statements spoken by the agent, each statement of the cluster of statements confirming that the agent is able to assist the customer with their problem;
    selecting a statement, of the cluster of statements, associated with the problem statement; and determining an end of the region to precede the selected statement.

10. The system of claim 7, wherein execution of the instructions causes the system to perform operations further comprising preprocessing the transcript by filtering uninformative sentences from the transcript.

11. The system of claim 10, wherein execution of the instructions to filter uninformative sentences from the transcript causes the system to perform operations further comprising filtering the transcript based at least in part on a term frequency inverse document frequency (tf-idf) operation.

12. The system of claim 7, wherein execution of the instructions causes the system to perform operations further comprising preprocessing the transcript to filter one or more stop words and disfluencies from the transcript.

13. A method for identifying problem-relevant sentences, the method performed by one or more processors and comprising:
  receiving a plurality of transcripts of historical support calls;
  receiving a plurality of historical problem summaries, each historical problem summary of the plurality of historical problem summaries corresponding to a transcript of the plurality of transcripts; and
  training a regression model to predict a relevancy of one or more customer utterances in an identified region of an input support call transcript, wherein training the regression model is based on a predicted degree of similarity between the historical problem summaries and historical customer utterances in the corresponding transcripts of the plurality of transcripts, the predicted degree of similarity based at least in part on a bidirectional encoder representation from transformers (BERT) metric.

14. The method of claim 13, wherein the identified region of the input support call transcript is identified based at least in part on identifying a cluster of questions spoken by an agent participating in the first support call, each question of the cluster of questions querying a user participating in the first support call to identify a problem, selecting a question, of the cluster of questions, associated with the problem statement, and determining a start of the region to follow the selected question.

15. The method of claim 14, wherein the identified region of the input support call transcript is further identified based at least in part on identifying a cluster of statements spoken by the agent, each statement of the cluster of statements confirming that the agent is able to assist the customer with the problem, selecting a statement, of the cluster of statements, associated with the problem statement, and determining an end of the region to precede the selected statement.

16. The method of claim 13, wherein the input support call transcript is preprocessed to filter uninformative sentences from the input support call transcript.

17. The method of claim 16 wherein the input support call transcript is filtered based at least in part on a term frequency inverse document frequency (tf-idf) operation.

18. The method of claim 13, wherein the input support call transcript is preprocessed to filter one or more stop words or disfluencies from the input support call transcript.

* * * * *